(12) United States Patent
Yang

(10) Patent No.: US 11,732,742 B2
(45) Date of Patent: Aug. 22, 2023

(54) ANTI-LOOSENING BOLT AND NUT ASSEMBLY STRUCTURE

(71) Applicant: Xiaohua Yang, Taizhou (CN)

(72) Inventor: Xiaohua Yang, Taizhou (CN)

( * ) Notice: Subject to any disclaimer, the term of this patent is extended or adjusted under 35 U.S.C. 154(b) by 500 days.

(21) Appl. No.: 15/930,456

(22) Filed: May 13, 2020

(65) Prior Publication Data

US 2020/0400182 A1 Dec. 24, 2020

(30) Foreign Application Priority Data

Jun. 18, 2019 (CN) .......................... 201920918852.7

(51) Int. Cl.
*F16B 23/00* (2006.01)

(52) U.S. Cl.
CPC ................................ *F16B 23/0076* (2013.01)

(58) Field of Classification Search
CPC ............... F16B 39/282; F16B 23/0076; F16B 23/0061; F16B 43/004; F16B 39/24; F16B 39/14; F16B 39/26; F16B 39/12; F16B 39/22; F16B 39/32; F16B 39/36; F16B 23/0092
USPC ................. 411/246, 253, 265, 270, 277, 278
See application file for complete search history.

(56) References Cited

U.S. PATENT DOCUMENTS

| | | | | |
|---|---|---|---|---|
| 3,606,357 A * | 9/1971 | Yonkers | ................ | F16B 43/001 277/637 |
| 4,103,725 A * | 8/1978 | Abe | ....................... | F16B 39/24 411/957 |
| 5,056,975 A * | 10/1991 | Ando | ...................... | F16B 43/00 411/162 |
| 6,749,386 B2 * | 6/2004 | Harris | ................... | F16B 39/282 411/161 |
| 8,899,895 B2 * | 12/2014 | McKinlay | ............... | F16B 39/24 411/949 |
| 2007/0243040 A1 * | 10/2007 | Chen | ..................... | F16B 39/282 411/161 |
| 2011/0274514 A1 * | 11/2011 | Lee | ......................... | F16B 43/00 411/368 |
| 2014/0017028 A1 * | 1/2014 | McKinlay | ............. | F16B 41/002 411/149 |
| 2014/0348609 A1 * | 11/2014 | Chen | ..................... | F16B 39/282 411/209 |
| 2022/0106976 A1 * | 4/2022 | Seyboldt | ................. | F16B 39/24 |

* cited by examiner

*Primary Examiner* — Victor D Batson
*Assistant Examiner* — Dil K. Magar
(74) *Attorney, Agent, or Firm* — Leong C. Lei

(57) ABSTRACT

An anti-loosening bolt and nut assembly structure includes a bolt having a bolt head and a bolt shank, two elastic washers, and a nut. The two elastic washers are sleeved on the bolt shank. The two elastic washers are matched with the bolt head and the nut, respectively. Each elastic washer includes an annular body having an opening. A bottom of the annular body is provided with anti-slip teeth. A top of the annular body extends upward to form an anti-loosening ring. An outer inclined surface is formed on an outer side of the anti-loosening ring. The anti-loosening ring is provided with a plurality of first unidirectional teeth. The bolt head and the nut each includes a unidirectional anti-loosening device matched with the first unidirectional teeth.

9 Claims, 6 Drawing Sheets

ANTI-LOOSENING BOLT AND NUT ASSEMBLY STRUCTURE

BACKGROUND OF THE INVENTION

1. Field of the Invention

The present invention relates to an anti-loosening bolt and nut assembly structure, and more particularly to elastic washers, a bolt assembly and a nut assembly of an anti-loosening bolt and nut assembly structure.

2. Description of the Prior Art

In an anti-loosening bolt and nut assembly structure, a bolt is inserted through the through hole of a workpiece, and then is screwed with two nuts to achieve an anti-loosening purpose. Or, the bolt is inserted through the through hole of the workpiece, and then a washer or elastic pad is sleeved on the bolt, and finally the nut is screwed on, which can also achieve an anti-loosening purpose. However, when this conventional anti-loosening bolt and nut assembly structure is used in special fields (such as high-speed vibrating workpieces, aerospace fields, etc.), since the contact surfaces of the nut, the bolt and the workpiece as well as the contact surfaces of the nut and elastic pad or the elastic washer are all flat surfaces, it is easy to cause the bolt or nut to rotate and become loose due to vibration of the workpiece.

China Patent Application No. 201810564542.X discloses an anti-loosening washer and a bolt with the anti-loosening washer, which is filed by the applicant. The anti-loosening washer includes a washer body. The front of the washer body is circumferentially, evenly provided with elastic pieces. The elastic piece includes a root connected to the washer body and an elastic portion connected to the root. A space is defined between the elastic portion and the washer body. The space includes a first gap, a second gap, and a third gap. The first gap gradually decreases toward the second gap. A drop-shaped structure is formed from the third gap to the second gap. An accommodating space is defined between every adjacent two of the roots. When the elastic portion is squeezed in the axial direction, the elastic portion is matched and fitted in the accommodating space. The free end face and the inner surface of the elastic portion are pressed against the inner wall of the accommodating space, respectively. The above anti-loosening washer can solve the main defect of the existing anti-loosening bolt and nut assembly structure, strengthen the connection between the bolt and the workpiece, and prevent the bolt from loosening. However, in the actual use, it is difficult to process the space of the anti-loosening washer, the difficulty of mass production is high, and the production cost is high.

China Utility Model Publication No. CN 203594673 U discloses an anti-loosening anti-theft bolt and nut assembly, comprising a nut, a bolt and a washer. When the washer in cooperation with the nut and the bolt is placed on the surface of a workpiece, the apexes can generate a great friction force with the surface of the workpiece, so that the washer can be more firmly locked to the surface of the workpiece and will not be loosened due to rotation of the nut. However, the nut, the bolt and the washer of the above structure have the following defects. (1) Under extreme conditions, the washer is prone to break. Because the washer doesn't have a limit structure, the washer spreads out after breaking, thus losing its anti-loosening effect. (2) It can be derived from the drawings in the specification that the continuous inclined surface and the meshing inclined surface have a longitudinal symmetrical relationship. This results in the thinnest and thickest portions of the washer. At the thinnest portion, the thickness of the washer is less, its overall bearing strength is low, and it is easy to break. (3) A notch is formed on the outer circumferential surface of the washer. The notch is configured to receive the claw of a special tool, so that the nut and the washer can be turned. However, the notch also reduces the overall strength of the washer. (4) The washer is exposed, so it is easy to be corroded by external factors, resulting in a decrease in anti-loosening performance.

SUMMARY OF THE INVENTION

The technical problem to be solved by the present invention is to provide an anti-loosening bolt and nut assembly structure and its elastic washer, which makes it convenient for processing and production, and improves its own bearing strength, and has a stable structure and a long service life. It can be used normally in the event of breakage under extreme conditions, thereby providing an anti-loosening effect.

In order to achieve the above object, the present invention adopts the following technical solutions:

An anti-loosening bolt and nut assembly structure comprises a bolt, two elastic washers, and a nut. The bolt includes a bolt head and a bolt shank. The two elastic washers are sleeved on the bolt shank. The nut is matched with and screwed to the bolt shank. The two elastic washers are matched with the bolt head and the nut, respectively. Each of the elastic washers includes an annular body having an opening. A bottom of the annular body is provided with anti-slip teeth. A top of the annular body extends upward to form an anti-loosening ring. The anti-loosening ring has a taper so that an outer inclined surface is formed on an outer side of the anti-loosening ring. The anti-loosening ring is circumferentially provided with a plurality of first unidirectional teeth. The bolt head and the nut each includes a unidirectional anti-loosening device matched with the first unidirectional teeth of a corresponding one of the elastic washers.

Preferably, the unidirectional anti-loosening device includes an engaging groove that is disposed in each of the bolt head and the nut and faces an end face of the corresponding elastic washer. The engaging groove is coaxial with the bolt head and the nut. The engaging groove is circumferentially, evenly provided with a plurality of second unidirectional teeth. The second unidirectional teeth have force-bearing surfaces facing a tightening direction of the bolt and nut. The first unidirectional teeth have force-bearing surfaces corresponding to and meshed with the force-bearing surfaces of the second unidirectional teeth.

Preferably, the engaging groove is formed by an outer annular surface, an inner annular surface and a bottom connecting the outer annular surface and the inner annular surface. The outer annular surface is an inclined surface. The plurality of second unidirectional teeth is formed on the bottom. The anti-loosening ring is engaged in the engaging groove. The outer inclined surface corresponds to and is matched with the outer annular surface.

Preferably, each of the first unidirectional teeth is composed of a transverse inclined surface and an upright inclined surface, an included angle between the transverse inclined surface and the upright inclined surface is an acute angle or a right angle. The bolt shank and the nut each have threads with a pitch less than a height of the upright incline surface.

Preferably, a bottom of the anti-loosening ring has an outer diameter less than that of the annular body, so that a stepped surface is formed between an outer edge of the bottom of the anti-loosening ring and an outer edge of the annular body. The anti-loosening ring has an inner diameter equal to that of the annular body.

Preferably, the number of the first unidirectional teeth is 3-6.

Preferably, a bottom of the bolt head forms a contact surface between the outer annular surface of the engaging groove and an outer circumferential surface of the bolt head. The contact surface corresponds to and is matched with the stepped surface.

Preferably, an outer circumferential surface of each of the bolt head and the nut is circumferentially, evenly provided with a plurality of pull blocks. An outer circumferential surface of the annular body is circumferentially, evenly provided with a plurality of pull lugs. The pull blocks and the pull lugs are aligned and matched with each other, respectively. A central angle between every adjacent two of the pull blocks, a central angle between every adjacent two of the pull lugs, a central angle between every adjacent two of the first unidirectional teeth and a central angle between every adjacent two of the send unidirectional teeth are equal to each other.

Preferably, the second unidirectional teeth and the first unidirectional teeth are arranged in opposite directions and have an identical structure.

The beneficial effects of the present invention are described below.

Compared with the prior art, in the anti-loosening bolt and nut assembly structure provided by the present invention, the elastic washer, the bolt and the nut have a simple structure, which is convenient for processing and mass production, has a low manufacturing cost, and is easy to achieve marketization. The overall structure is more stable, and the service life is long, and the anti-loosening effect is better.

Compared with the prior art, in the anti-loosening bolt and nut assembly structure provided by the present invention, the elastic washer has the anti-slip teeth to be in contact with the surface of a workpiece, thereby providing an anti-loosening effect. In addition, when the elastic washer is used in conjunction with the bolt and the nut, the force-bearing surfaces of the second unidirectional teeth of the bolt and the nut are pressed against the force-bearing surfaces of the first unidirectional teeth of the elastic washer, so that the elastic washer and the bolt as well as the elastic washer and the nut are rotated and tightened synchronously. If the bolt or nut is loosened by vibration, the bolt and nut will have reverse rotation. Because the pitch of the threads is less than the height of the first unidirectional teeth and due to the action of the transverse inclined surface, the bolt or nut is restricted when it is loose. That is, the greater the reverse rotation, the greater the squeezing force between the second unidirectional teeth and the first unidirectional teeth, and the greater the anti-loosening effect.

Compared with the prior art, in the anti-loosening bolt and nut assembly structure provided by the present invention, the outer annular surface of the engaging groove of the bolt or the inner wall of the engaging groove of the nut wraps the anti-loose ring of the elastic washer. When the elastic washer breaks under extreme conditions, the whole elastic washer can still be kept in the engaging groove to avoid the bolt assembly or the nut assembly from losing its anti-loosening effect. In addition, the outer inclined surface is matched with the outer annular surface and the inner wall, which is beneficial for the elastic washer to be inserted into the engaging groove smoothly.

Compared with the prior art, in the anti-loosening bolt and nut assembly structure provided by the present invention, the elastic washer has the anti-loosening ring, so that the overall thickness of the elastic washer is great and the bearing capacity is strong.

Compared with the prior art, in the anti-loosening bolt and nut assembly structure provided by the present invention, the anti-loosening ring is embedded in the engaging groove, which has a protective effect on the anti-loosening ring, prevents the anti-loosening ring from being corroded by external factors, prevents the anti-loosening ring from rusting, and prolongs its service life.

Compared with the prior art, in the anti-loosening bolt and nut assembly structure provided by the present invention, the contact surface corresponds to and is matched with the stepped surface, thereby providing a better squeeze positioning effect on the elastic washer and improving the anti-loosening performance.

DETAILED DESCRIPTION OF THE PREFERRED EMBODIMENTS

Embodiments of the present invention will now be described, by way of example only, with reference to the accompanying drawings.

Figure 1:
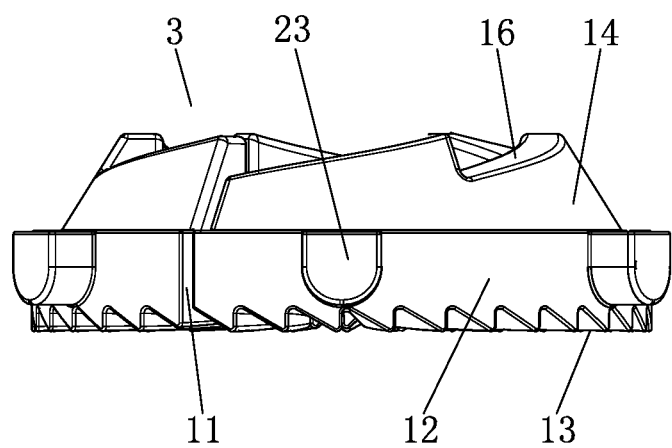
FIG. 1 is a schematic view of the elastic washer of the present invention.
Figure 2:
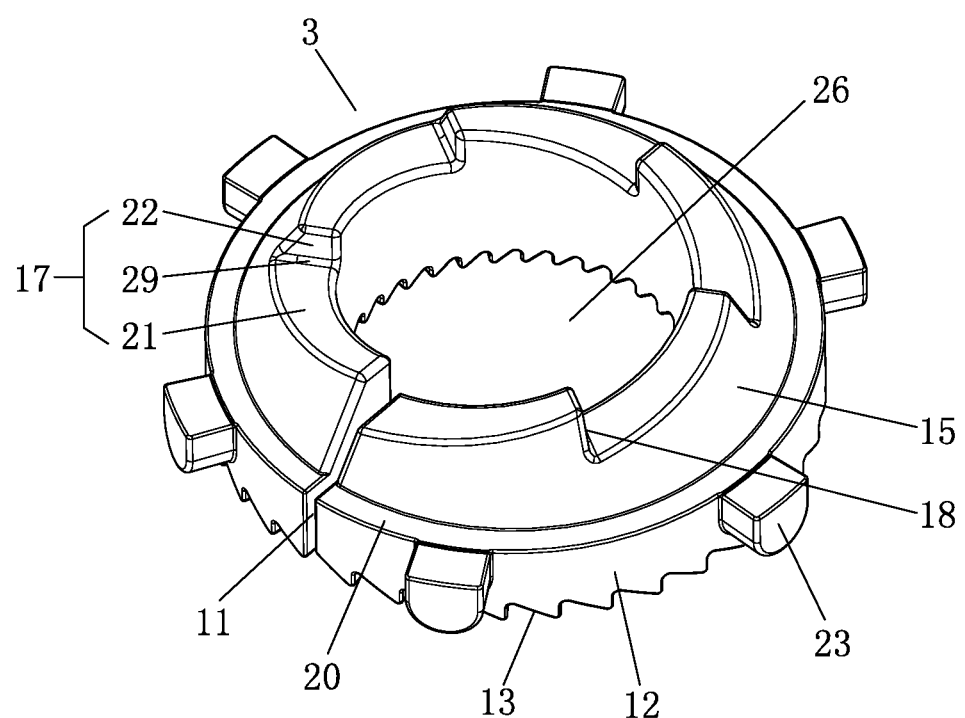
FIG. 2 is a perspective view of the elastic washer of the present invention.
Figure 3:
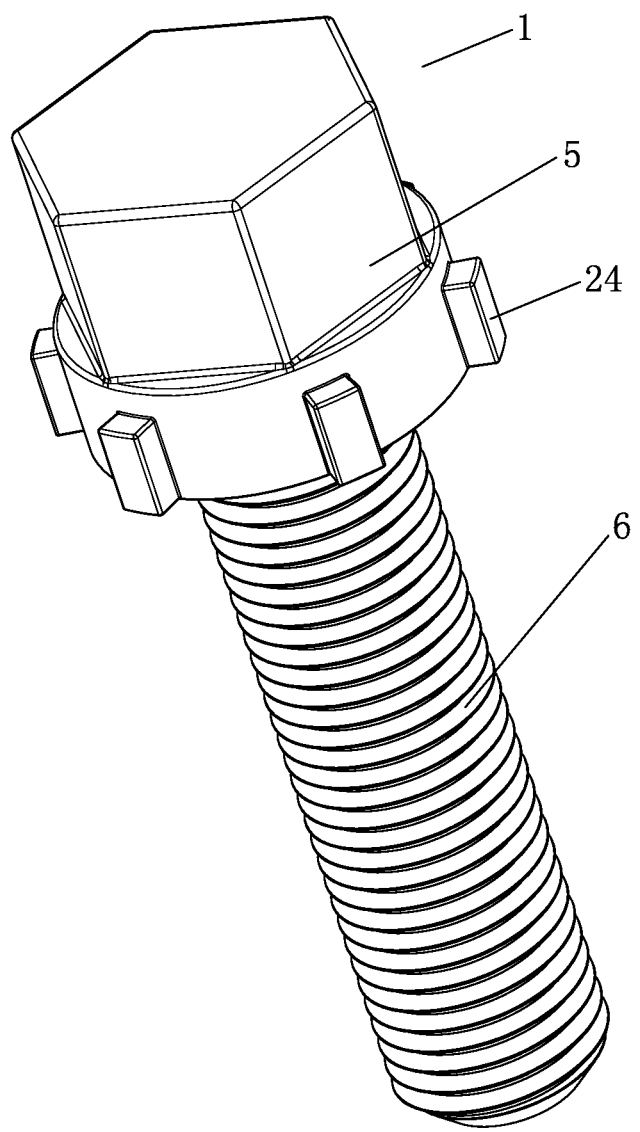
FIG. 3 is a perspective view of the bolt of the present invention.
Figure 5:
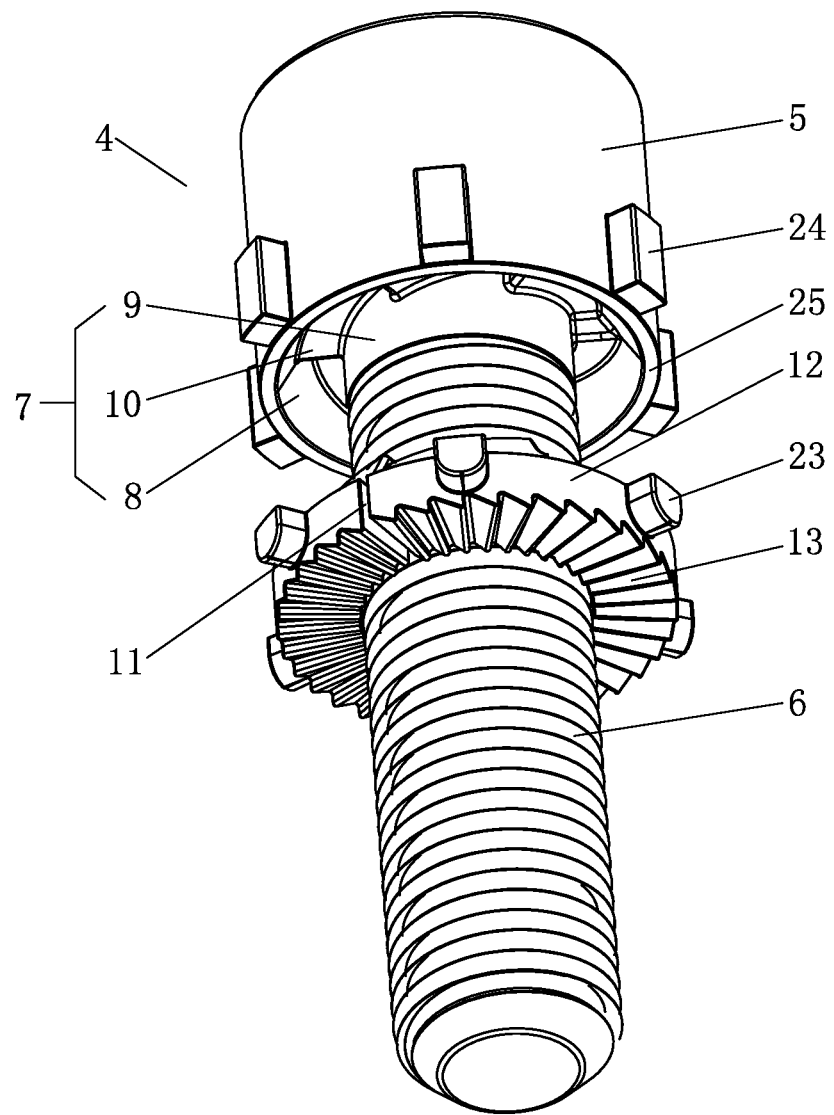
FIG. 5 is an exploded view of the bolt assembly of the present invention.

Referring to FIG. 1, FIG. 2, FIG. 3 and FIG. 5, the present invention provides an anti-loosening bolt and nut assembly structure, comprising a bolt 1, two elastic washers 3, and a nut 2. The bolt 1 includes a bolt head 5 and a bolt shank 6. The two elastic washers 3 are sleeved on the bolt shank 6. The nut 2 is matched with and screwed to the bolt shank 6. The two elastic washers 3 are matched with the bolt head 5 and the nut 2, respectively. The elastic washer 3 includes an annular body 12 having an opening 11. The bottom of the annular body 12 is provided with anti-slip teeth 13. The top of the annular body 12 extends upward to form an anti-loosening ring 14. The anti-loosening ring 14 has a taper, so an outer inclined surface 15 is formed on an outer side of the anti-loosening ring 14. The anti-loosening ring 14 is circumferentially provided with a plurality of first unidirectional teeth 17. The bolt head 5 and the nut 2 each include a unidirectional anti-loosening device matched with the first unidirectional teeth 17 of the corresponding elastic washer 3.

The lower end of the bolt head 5 is connected to the upper end of the bolt shank 6. The lower end of the bolt head 5 is provided with an engaging groove 7 that is concentric with the bolt shank 6. The engaging groove 7 is formed with an outer annular surface 8, an inner annular surface 9 and a bottom connecting the outer annular surface 8 and the inner annular surface 9. The outer annular surface 8 is an inclined surface. The bottom is circumferentially, evenly provided with a plurality of second unidirectional teeth 10. The second unidirectional teeth 10 have force-bearing surfaces facing the tightening direction of the bolt 1.

The top of the anti-loosening ring 14 is circumferentially, evenly provided with a plurality of notches 16. The notches 16 make the top of the anti-loosening ring 14 form the first unidirectional teeth 17. The anti-loosening ring 14 is engaged in the engaging groove 7. The outer inclined surface 15 corresponds to and is matched with the outer annular surface 8. The first unidirectional teeth 17 have force-bearing surfaces 18 corresponding to and meshed with the force-bearing surfaces 19 of the second unidirectional teeth 10.

The anti-slip teeth 13 and the first unidirectional teeth 17 are arranged in opposite directions.

Preferably, the outer diameter of the bottom of the anti-loosening ring 14 is less than the outer diameter of the annular body 12, so that a stepped surface 20 is formed between the outer edge of the bottom of the anti-loosening ring 14 and the outer edge of the annular body 12. The inner diameter of the anti-loosening ring 14 is equal to the inner diameter of the annular body 12.

Preferably, the number of the first unidirectional teeth 17 is 3-6.

Preferably, each of the first unidirectional teeth 17 is composed of a transverse inclined surface 21 and an upright inclined surface 22. The included angle between the transverse inclined surface 21 and the upright inclined surface 22 is an acute angle or a right angle. The second unidirectional teeth 10 and the first unidirectional teeth 17 are arranged in opposite directions and have an identical structure. A chamfer 29 is disposed between the transverse inclined surface 21 and the upright inclined surface 22.

The upright inclined surfaces 22 serve as the force-bearing surfaces of the first unidirectional teeth 17 and the second unidirectional teeth 10.

Preferably, the pitch of the threads of the bolt shank 6 is less than the height of the upright incline surface 22.

Preferably, the outer circumferential surface of the annular body 12 is circumferentially, evenly provided with a plurality of pull lugs 23. The outer circumferential surface of the bolt head 5 is circumferentially, evenly provided with a plurality of pull blocks 24. The pull blocks 24 and the pull lugs 23 are aligned and matched with each other, respectively. A central angle between every adjacent two of the pull blocks 24, a central angle between every adjacent two of the pull lugs 23, a central angle between every adjacent two of the first unidirectional teeth 17 and a central angle between every adjacent two of the second unidirectional teeth 10 are equal to each other.

The inner annular surface 9 of the engaging groove 7 is coplanar with the outer peripheral surface of the bolt shank 6. The bottom of the bolt head 5 forms a contact surface 25 between the outer annular surface 8 of the engaging groove 7 and the outer circumferential surface of the bolt head 5. The contact surface 25 corresponds to and is matched with the stepped surface 20.

The use of the bolt assembly 4 of the present invention is described below.

The bolt shank 6 of the bolt 1 is inserted through the inner hole 26 of the annular body 12 of the elastic washer 3, and the bottom of the bolt head 5 faces the anti-loosening ring 14 of the annular body 12. Then, the bolt shank 6 is screwed into the screw hole of a workpiece. The anti-slip teeth 13 on the bottom of the annular body 12 are pressed against the surface of the workpiece. As the bolt shank 6 is continuously screwed into the screw hole of the workpiece, the engaging groove 7 in the bottom of the bolt head 5 is closer to the anti-loosening ring 14 on the top of the annular body 12 until the engaging groove 7 wraps the anti-loosening ring 14. When the force-bearing surfaces 19 of the second unidirectional teeth 10 in the engaging groove 7 abut against the force-bearing surfaces 18 of the first unidirectional teeth 17 of the anti-loosening ring 14 to form overlapping surfaces, the bolt 1 synchronously drives the elastic washer 3 to rotate. When the bolt 1 is further screwed, the overlapping area of the force-bearing surfaces 19 of the second unidirectional teeth 10 in the engaging groove 7 and the force-bearing surfaces 18 of the first unidirectional teeth 17 of the anti-loosening ring 14 becomes larger and larger until they are completely superimposed. When the bolt 1 cannot be further screwed, at this time, the opening 11 of the elastic washer 3 is in a closed state, and the entire elastic washer 3 is flat, thereby achieving an anti-loosening effect.

Because the central angle between every adjacent two of the pull blocks 24, the central angle between every adjacent two of the pull lugs 23, the central angle between every adjacent two of the first unidirectional teeth 17 and the central angle between every adjacent two of the second unidirectional teeth 10 are equal to each other, the plurality of pull blocks 24 and the plurality of pull lugs 23 are always aligned with each other, respectively.

When the bolt 1 needs to be unscrewed, a special tool is used, and a plurality of notches of the special tool correspond to the plurality of pull blocks 24 and the plurality of pull lugs 23, so that the bolt 1 and the elastic washer 3 become one-piece. The bolt assembly 4 can be unscrewed by simply turning the bolt assembly 4 in reverse.

When a conventional workpiece reversely rotates the bolt 1 of the bolt assembly 4, or the bolt 1 rotates reversely due to high-strength vibration, the bolt 1 generates a certain reverse rotation displacement. Because the pitch of the threads of the bolt shank 6 is less than the height of the upright incline surface 22 of the first unidirectional teeth 17, in other words, when the bolt shank 6 rotates the central angle between every adjacent two of the first unidirectional teeth 17, the tips of the second unidirectional teeth 10 cannot pass the tips of the first unidirectional teeth 17, the second unidirectional teeth 10 are still in the notches 16 of the anti-loosening ring 14. That is, the second unidirectional teeth 10 are still engaged with the first unidirectional teeth 17, and the tips of the second unidirectional teeth 10 tightly abut against the transverse inclined surfaces 21 of the first unidirectional teeth 17. The elastic washer 3 is subjected to the force of the second unidirectional teeth 10 to be combined with the surface of the workpiece more tightly. Due to the presence of the anti-slip teeth 13, the bolt assembly 4 can be more tightly combined with the workpiece, without the possibility of loosening.

Figure 4:
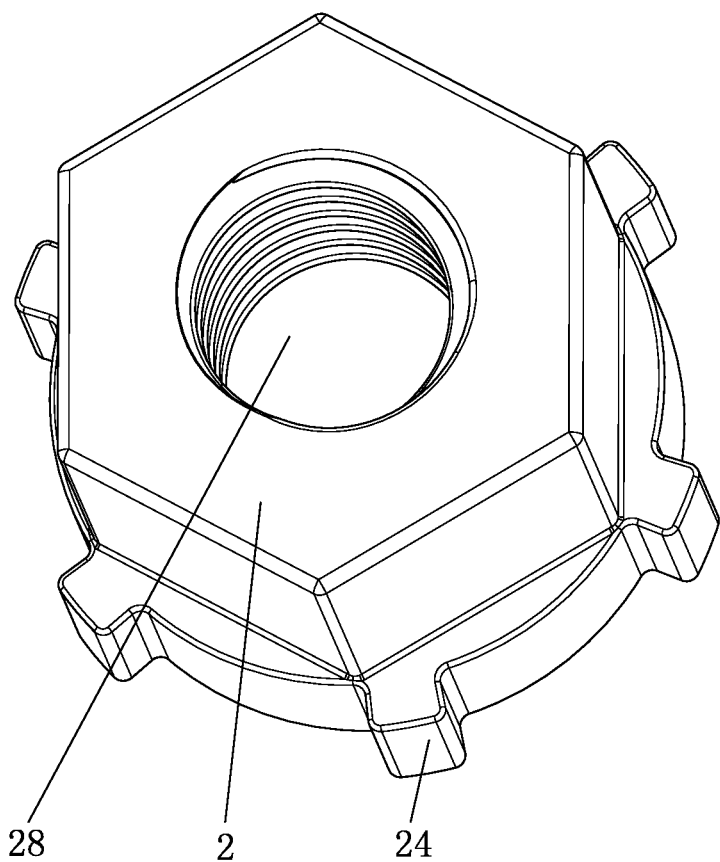
FIG. 4 is a perspective view of the nut of the present invention.
Figure 6:
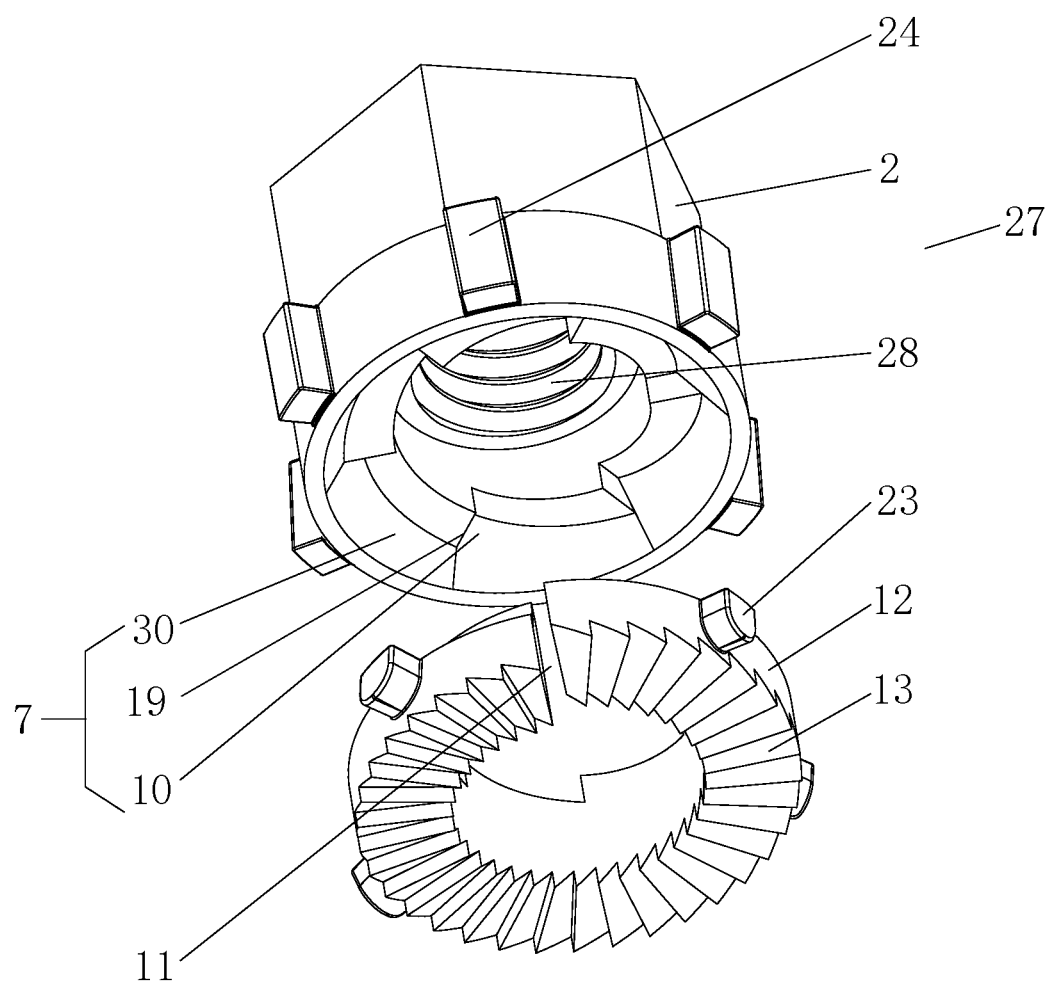
FIG. 6 is an exploded view of the nut assembly of the present invention.

Please refer to FIG. 1, FIG. 2, FIG. 3, FIG. 4 and FIG. 6. The nut 2 and the elastic washer 3 of the present invention are combined to form a nut assembly 27 as another embodiment, including the nut 2 and the elastic washer 3. The nut 2 has a screw hole 28. The bottom of the nut 2 is provided with an engaging groove 7 that is concentric with the screw hole 28. The engaging groove 7 is formed with an inner wall 30 and a bottom. The inner wall 30 is an inclined surface. The bottom is circumferentially, evenly provided with a plurality of second unidirectional teeth 10. The second unidirectional teeth 10 have force-bearing surfaces 19 facing the tightening direction of the bolt 1. The elastic washer 3 includes an annular body 12 having an opening 11. Anti-slip teeth 13 are provided on the bottom of the annular body 12. The top of the annular body 12 extends upward to form an anti-loosening ring 14. The anti-loosening ring 14 has a taper, so an outer inclined surface 15 is formed on an outer side of the anti-loosening ring 14. The top of the anti-loosening ring 14 is circumferentially provided with a plurality of notches 16. The notches 16 make the top of the anti-loosening ring 14 form a plurality of first unidirectional teeth 17. The anti-loosening ring 14 is engaged in the engaging groove 7. The outer inclined surface 15 is matched with the inner wall 30. The first unidirectional teeth 17 have force-bearing surfaces 18 corresponding to and meshed with the force-bearing surfaces 19 of the second unidirectional teeth 10.

Preferably, the outer diameter of the bottom of the anti-loosening ring 14 is less than the outer diameter of the annular body 12, so that a stepped surface 20 is formed between the outer edge of the bottom of the anti-loosening ring 14 and the outer edge of the annular body 12. The inner diameter of the anti-loosening ring 14 is equal to the inner diameter of the annular body 12.

Preferably, the number of the first unidirectional teeth 17 is 3-8.

Preferably, each of the first unidirectional teeth 17 is composed of a transverse inclined surface 21 and an upright inclined surface 22. The included angle between the transverse inclined surface 21 and the upright inclined surface 22 is an acute angle or a right angle. The second unidirectional teeth 10 and the first unidirectional teeth 17 are arranged in opposite directions and have an identical structure.

Preferably, the pitch of the threads of the screw hole 28 is less than the height of the upright incline surface 22.

Preferably, the outer circumferential surface of the annular body 12 is circumferentially, evenly provided with a plurality of pull lugs 23. The outer circumferential surface of the nut 2 is circumferentially, evenly provided with a plurality of pull blocks 24. The pull blocks 24 and the pull lugs 23 are aligned and matched with each other, respectively. A central angle between every adjacent two of the pull blocks 24, a central angle between every adjacent two of the pull lugs 23, a central angle between every adjacent two of the first unidirectional teeth 17 and a central angle between every adjacent two of the second unidirectional teeth 10 are equal to each other.

The inner annular surface 9 of the engaging groove 7 is coplanar with the bottom of the screws of the screw hole 28 of the nut 2. The bottom of the nut 2 forms a contact surface 25 between the inner wall 30 of the engaging groove 7 and the outer circumferential surface of the nut 2. The contact surface 25 corresponds to and is matched with the stepped surface 20.

The assembly, combination, and working principle between the elastic washer 3 and the engaging groove 7 of this embodiment are the same as those of the first embodiment, and the use of this embodiment will not be described hereinafter.

The elastic washer, the bolt assembly and the nut assembly of the anti-loosening bolt and nut assembly structure provided by the embodiments of the present invention have been described in detail above. Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An anti-loosening bolt and nut assembly structure, comprising a bolt, two elastic washers and a nut, the bolt including a bolt head and a bolt shank, the two elastic washers being sleeved on the bolt shank, the nut being engaged with and screwed to the bolt shank, the two elastic washers being engaged with the bolt head and the nut, respectively; each of the two elastic washers including an annular body having an opening, a bottom of the annular body being provided with anti-slip teeth, a top of the annular body extending upward to form an anti-loosening ring, the anti-loosening ring having a taper so that an outer inclined surface is formed on an outer side of the anti-loosening ring, the anti-loosening ring being circumferentially provided with a plurality of first unidirectional teeth; the bolt head and the nut each including a unidirectional anti-loosening device engaged with the first unidirectional teeth of a corresponding one of the elastic washers.

2. The anti-loosening bolt and nut assembly structure as claimed in claim 1, wherein the unidirectional anti-loosening device includes an engaging groove that is disposed in each of the bolt head and the nut and faces an end face of the corresponding elastic washer, the engaging groove is coaxial with the bolt head and the nut, the engaging groove is circumferentially, evenly provided with a plurality of second unidirectional teeth, the second unidirectional teeth have force-bearing surfaces facing a tightening direction of the bolt and nut; and the first unidirectional teeth have force-bearing surfaces corresponding to and meshed with the force-bearing surfaces of the second unidirectional teeth.

3. The anti-loosening bolt and nut assembly structure as claimed in claim 2, wherein the engaging groove is formed by an outer annular surface, an inner annular surface and a bottom connecting the outer annular surface and the inner annular surface, the outer annular surface is an inclined surface, the plurality of second unidirectional teeth are formed on the bottom, the anti-loosening ring is engaged in the engaging groove, and the outer inclined surface corresponds to and is engaged with the outer annular surface.

4. The anti-loosening bolt and nut assembly structure as claimed in claim 1, wherein each of the first unidirectional teeth is composed of a transverse inclined surface and an upright inclined surface, an included angle between the transverse inclined surface and the upright inclined surface is an acute angle or a right angle; the bolt shank and the nut each have threads with a pitch less than a height of the upright incline surface.

5. The anti-loosening bolt and nut assembly structure as claimed in claim 1, wherein a bottom of the anti-loosening ring has an outer diameter less than that of the annular body, so that a stepped surface is formed between an outer edge of the bottom of the anti-loosening ring and an outer edge of the annular body; the anti-loosening ring has an inner diameter equal to that of the annular body.

6. The anti-loosening bolt and nut assembly structure as claimed in claim 1, wherein the number of the first unidirectional teeth is 3-6.

7. The anti-loosening bolt and nut assembly structure as claimed in claim 5, wherein a bottom of the bolt head forms a contact surface between the outer annular surface of the engaging groove and an outer circumferential surface of the bolt head, and the contact surface corresponds to and is engaged with the stepped surface.

8. The anti-loosening bolt and nut assembly structure as claimed in claim 2, wherein an outer circumferential surface of each of the bolt head and the nut is circumferentially, evenly provided with a plurality of pull blocks, an outer circumferential surface of the annular body is circumferentially, evenly provided with a plurality of pull lugs; the pull blocks and the pull lugs are aligned and engaged with each other, respectively; a central angle between every adjacent two of the pull blocks, a central angle between every adjacent two of the pull lugs, a central angle between every adjacent two of the first unidirectional teeth and a central angle between every adjacent two of the second unidirectional teeth are equal to each other.

9. The anti-loosening bolt and nut assembly structure as claimed in claim 2, wherein the second unidirectional teeth and the first unidirectional teeth are arranged in opposite directions and have an identical structure.

* * * * *